United States Patent Office 2,890,200
Patented June 9, 1959

2,890,200

CHLOROETHYLENE POLYMER STABILIZED WITH 1,2-EPOXYPROPAN-3-ONE DERIVATIVES

Robert L. Hudson, Midland, Mich., assignor to The Dow Chemical Company, Midland, Mich., a corporation of Delaware No Drawing. Application October 8, 1956
Serial No. 614,373

6 Claims. (Cl. 260—45.8)

This invention relates to the thermal stabilization of haloethylene polymers. More particularly it relates to new compositions based on haloethylene polymers having improved thermal stability over prior known compositions.

It is known that haloethylene polymers, such as polyvinyl chloride and the copolymers of vinyl chloride and vinylidene chloride, are subject to appreciable discoloration when exposed to elevated temperatures, such as those encountered in thermal fabrication operations, for even short periods, and also when the fabricated articles are exposed for prolonged periods to more moderate but warm temperatures such as those of direct tropical or subtropical weathering. That thermal sensitivity has seriously restricted the applications in which haloethylene polymers may be employed. One of the common means for alleviating that discoloration has been to employ certain additives as heat stabilizers in the polymer formulations. Those additives have consisted commonly of inorganic salts which were incompatible with the polymer, prohibiting the production of transparent articles, or were high melting, or they consisted of organo-metallic compounds which were expensive and difficult to prepare and in some instances adversely affected the stability of the plasticizers that were used in the formulation. The secondary requirements of a suitable heat stabilizer are manifold and varied. A stabilizer should preferably be compatible with and inert to all elements of the formulation. It should be odor-free, if possible, and colorless or at least not impart a color to the formulation. It is desirable that it be tasteless and non-toxide. Further it should be insoluble in water and the common solvents. In view of the many requirements for a useful heat stabilizer, it is impossible for an investigator to predict the effectiveness of any particular compound with any degree of certainty and continuous search is being made for new and more effective heat stabilizers.

It is accordingly an object of this invention to provide a novel thermally stable composition based upon haloethylene polymers.

It is a further object to provide such compositions which are thermally stabilized with metal-free stabilizers.

The above and related objects are achieved with a composition comprising a haloethylene polymer and stabilizing quantities of a 1,2-epoxy propan-3-one derivative having the general formula:

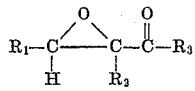

wherein $R_1$ is selected from the group consisting of aryl and substituted aryl, $R_2$ is selected from the group consisting of hydrogen and alkyl, and $R_3$ is selected from the group consisting of phenyl, halophenyl, and alkylphenyl, and epoxy groups substituted with the values of $R_1$ and $R_2$. Compositions thus prepared show outstanding stability to discoloration caused by exposure to elevated temperatures.

Any polymer containing halide groups in the carbon chain may be stabilized with epoxy compounds of this invention. As typical examples may be mentioned the polymers of vinyl chloride and of vinylidene chloride and the copolymers of vinyl chloride and of vinylidene chloride with each other or with another monoethylenically unsaturated monomer, such as acrylonitrile and vinyl acetate. The polymers and copolymers composed predominantly of vinylidene chloride are particularly sensitive to thermal exposure and are accordingly preferred.

The stabilizers useful in the compositions of this invention are those epoxy compounds falling within the above defined general formula. Some homologs and analogs of the claimed compounds not only do not stabilize haloethylene polymers but actually contribute to the degradation and consequent discoloration. Thus, $R_1$ in the defined formula must be an unsubstituted phenyl group or a phenyl group substituted with halogen, alkyl, or similar substituents. When $R_1$ is an alkyl group or a substituted alkyl group the compounds do not exhibit thermal stabilization properties in haloethylene polymer compositions. When $R_1$ is a hydrogen the compounds have little stabilization efficiency and in addition are too volatile to remain permanently in the compositions. It has been found that the other substituent on that carbon atom to which $R'$ is attached must be hydrogen. Compounds wherein that hydrogen is replaced by aryl are difficult to prepare. When that hydrogen is replaced by an alkyl group the resulting compound has a deleterious effect on the polymer composition.

Compound within the formula in which $R_2$ is an aryl group are costly and difficult to prepare and do not have significant thermal stabilization effectiveness. For practical and economic reasons it is preferred that when $R_2$ is alkyl it contain not more than 10 carbon atoms.

Compounds wherein $R_3$ is aryl are appreciably better stabilizers than those where $R_3$ is alkyl or hydrogen. Those in which $R_3$ is alkyl or hydrogen are so volatile as to have little use as stabilizing materials.

Typical members of useful compounds are:

1,3-diphenyl-1,2-epoxy propan-3-one
1,3-di-(p-chlorophenyl)-1,2-epoxy propan-3-one
1,3-di-(p-t-butylphenyl)-1,2-epoxypropan-3-one
1,5-diphenyl-1,2,4,5-diepoxypentan-3-one The preparation of the compounds is accomplished by treating the appropriate unsaturated ketone with alkaline hydrogen peroxide at room temperature or lower. Thus in preparing 1,3-diphenyl-1,2-epoxy propan-3-one a quantity of chalcone in alcohol solution is treated with alkaline hydrogen peroxide portionwise. The reaction temperature is kept below room temperature by immersing the reaction vessel in an ice bath. After the addition is complete the reaction is stirred overnight and then filtered. The product is in the form of white crystals. An alternative procedure is to react the appropriately substituted benzaldehyde with the appropriately substituted omega-bromoacetophenone in an absolute ether solution of sodium methoxide.

The epoxy compounds of this invention show stabilizing effectiveness when used in a concentration of at least 0.5 percent by weight based on the weight of haloethylene polymer. It is preferred to employ them in an amount of from 1 to 6 percent by weight. When more than 6 percent is used, the stabilizers become economically unattractive, no additional benefits accrue, and the physical properties, such as tensile strength, of the composition which are determined by the polymer may suffer.

The epoxy compounds are white solids allowing the production of white and pastel colored articles as well as transparent articles. Because of their organic nature they are capable of greater compatibility with the polymers than the prior known inorganic or organo-metallic compounds.

The compounds of this invention may be employed with the other additives commonly used in polymer formulations without any adverse effects resulting therefrom. Typical of such additives are light stabilizers, fillers, pigments, and dyes.

The compounds are easily incorporated into the polymer formulations by any known blending technique, such as dry blending and milling.

The effectiveness and advantages of the epoxy thermal stabilizers of this invention will be more apparent from the following illustrative example wherein all parts and percentages are by weight.

Several samples were prepared from a basic formulation consisting of 91.5 parts of a copolymer prepared from 85 percent vinylidene chloride and 15 percent vinyl chloride, 5 parts of ethyl phthalyl ethyl glycollate as a plasticizer and 1.5 parts of tertiary-butyl phenyl salicylate as a light stabilizer. One of the sample compositions was left unstabilized to heat for comparative purposes. To each of the remaining samples was added 2 parts of a thermal stabilizer. Some of the thermal stabilizers added were within the scope of this invention and some were not and the latter were used for comparison. The samples were evaluated according to a standard test. In that test a sample of about 20 grams of the composition is subjected to a temperature of 178° C. and the pressure of evolved hydrohalide gas used to determine the degree of thermal degradation. The results are relative to a standard and are reported as "T" values which are the times required for the samples to reach an arbitary rate of pressure rise. Thus, a more thermally stable composition will show a higher "T" value than a less stable composition. When the above samples were subjected to this test, the following results were obtained.

Thermal stabilizer:

| For comparison— | "T" value |
|---|---|
| None | 5 |
| 1,4-diphenyl-2,3-epoxybutane-1,4-dione | 7 |
| 1,3-diphenyl-1-methyl-1,2-epoxy propan-3-one | 4 |
| Compounds of this invention— | |
| 1,3-diphenyl-1,2-epoxypropan-3-one | 14 |
| 1,5-diphenyl-1,2,4,5-diepoxypentan-3-one | 12 |
| 1,3 - di(p-chlorophenyl)-1,2-epoxypropan-3-one | 10 |

The effectiveness of the compounds of this invention is readily apparent from the above results.

Similar results are observed when these epoxy compounds are employed as thermal stabilizers in compositions based on polyvinylchloride and other copolymers of vinyl chloride.

I claim:

1. A thermally stable composition comprising a chloroethylene polymer and stabilizing amounts of at least 0.5 percent based on the weight of said polymer of a 1,2-epoxypropan-3-one derivative having the general formula:

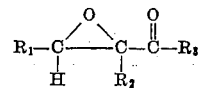

wherein $R_1$ is selected from the group consisting of phenyl, halophenyl, and alkyl substituted phenyl; $R_2$ is selected from the group consisting of hydrogen and alkyl; and $R_3$ is selected from the group consisting of phenyl, halophenyl, and alkyl substituted phenyl, and 1,2-epoxy groups substituted with the values of $R_1$ and $R_2$.

2. The composition claimed in claim 1 wherein said 1,2-epoxy propan-3-one derivative is present in an amount of from 0.5 to 6 percent by weight of said chloroethylene.

3. The composition claimed in claim 1 wherein said chloroethylene polymer is a copolymer composed predominantly of vinylidene chloride and containing a complementary amount of a monoethylenically unsaturated monomer.

4. The composition claimed in claim 1 wherein said 1,2-epoxypropan-3-one derivative is 1,3-diphenyl-1,2-epoxypropan-3-one.

5. The composition claimed in claim 1 wherein said 1,2 - epoxypropan - 3 - one derivative is 1,3 - di(p-chlorophenyl)-1,2-epoxypropan-3-one.

6. The composition claimed in claim 1 wherein said 1,2-epoxypropan-3-one derivative is 1,5-diphenyl-1,2,4,5-diepoxypentan-3-one.

References Cited in the file of this patent

UNITED STATES PATENTS

| 2,166,604 | Meyer | July 18, 1939 |
| 2,431,718 | Wilder et al. | Dec. 2, 1947 |

FOREIGN PATENTS

| 418,230 | Great Britain | Oct. 22, 1934 |